2,861,867

METHOD OF PURIFYING SODIUM CARBONATE AND BICARBONATE SOLUTIONS

Alfred Hirsch, Painesville, Ohio, assignor to Diamond Alkali Company, Cleveland, Ohio, a corporation of Delaware No Drawing. Application January 3, 1955
Serial No. 479,664

6 Claims. (Cl. 23—63)

This invention relates to the treatment of liquors containing sodium carbonate, sodium bicarbonate, and the like, for the purpose of purifying them in respect of iron values which they commonly contain.

Those skilled in the art are aware of the fact that commercial producers of sodium carbonate customarily produce a series of similar carbonate salts more or less in conjunction with sodium carbonate production. For example, sodium bicarbonate and sodium sesquicarbonate are commonly produced by manufacturers in the sodium carbonate business. Moreover, various grades of the products are usually prepared.

In the course of manufacturing these chemicals, it is found desirable to correlate the various processes to the fullest extent possible whereby to avoid wasteful practices and obtain production advantages. Accordingly, liquors containing valuable chemical components and from which one or more products have already been obtained oftentimes are employed, after suitable adjustment in chemical content, in the production of other related chemicals. This is possible in the manufacture or in the production of carbonate salts. Carbonate containing liquors may be adjusted quite easily in ratio of sodium bicarbonate to sodium carbonate by combining a plurality of liquors, by simply further carbonating a sodium carbonate containing liquor, by adding sodium carbonate, and in other manners known to those skilled in the art.

While the use of such residual liquors is highly desirable, disadvantages are encountered which spring largely from their continuous usage. In particular, they pick up impurities from the equipment through which they continuously pass and after a time such impurities build up to the point where the liquor is no longer usable without some treatment for the purpose of reducing the quantity of impurity that is present. Also, traces of impurities that originate from the basic raw materials accumulate to significant and excessive quantities in a crystallization process with recycle of mother liquors.

For example, in the manufacture of sodium sesquicarbonate a liquor recovered from any suitable source and having been employed in the production of any one of the variety of carbonate salts is adjusted to a suitable ratio for the precipitation of the sesquicarbonate salt, the sesquicarbonate is then obtained as a crystalline product and the mother liquor obtained therefrom, still rich in carbonate values and desirable for further use, is recycled in the process.

The cycle of production involving the preparation of sodium sesquicarbonate and other similar salts may continue indefinitely and, as noted above, under these circumstances impurities are inevitable.

Various manners may be employed for the removal of unwanted impurities, a common manner being continuously withdrawing from the mother liquor an effluent stream in quantity calculated to effect the desired level of purity in the process. An effluent stream may be withdrawn from the mother liquor flowing from the sesquicarbonate process.

The present invention is concerned with treating liquors rich in carbonate values for the purpose of removing impurities, particularly iron impurities.

As those skilled in the art will appreciate as the description of the present invention proceeds, the teachings of the invention are applicable to carbonate containing liquors in general and that, while the invention is described in connection with the treatment of an effluent stream from a carbonate containing liquor originating in a process leading to the production of sodium sesquicarbonate, the invention need not be and is not limited to the treatment of a liquor from any particular source.

As will be recognized from the foregoing, the effluent stream from the sesquicarbonate process is rich in desirable carbonate values, namely, sodium carbonate and sodium bicarbonate and it is quite valuable in the manufacture of, for example, pure sodium bicarbonate. However, since this liquor is intolerably high in iron values for most any purpose for which the liquor might be used, it is desirable to treat it for the purpose of reducing this impurity.

The actual constituency of such an effluent stream may vary considerably; for example, in parts by weight, the sodium carbonate to sodium bicarbonate ratio may be of the order of 2–9:1, a typical liquor analyzing in grams per liter 228.6 grams sodium carbonate, and 55.2 grams sodium bicarbonate, 0.12 gram iron, 1.63 grams chloride and 0.30 gram sulfur. Iron is usually held largely as colloidal iron hydroxides and/or sodium-iron complex salts, such as ferrites or ferrates. It can be seen that such a liquor is quite valuable and, therefore, desirable for recovery. Equally obvious, the iron content is quite high and must be reduced. Generally, it is desirable to hold the iron to, at most, about 0.0020 gram per liter and, of course, preferably less.

According to this invention, it has now been found that the heretofore difficult removable iron impurities picked up by complex liquors containing sodium carbonate and sodium bicarbonate may satisfactorily and efficiently be removed by effecting the precipitation of such iron impurities in the form of the hydroxide and thereafter filtering the precipitate from the liquor. Further, according to the invention, it has been found that the precipitate may suitably be obtained from the complex liquor by the addition thereto of an alkali metal hydroxide, preferably sodium hydroxide.

The formation of ferric hydroxide as a precipitate in a solution containing iron by the addition thereto of various hydroxides has been known heretofore and, therefore, the general concept of removing iron from solutions in general by forming its hydroxide is not here regarded as novel. However, difficulties are at times encountered and such method does not appear to be workable. For example, when hydroxides, such as sodium hydroxide, are added to complex liquors containing sodium carbonate and sodium bicarbonate in quantities calculated as the equivalent of the iron content of the liquor, very surprisingly, iron is not effectively precipitated; at the most, only a slight precipitation or cloudiness of the liquor takes place.

As noted above, according to this invention it has been discovered, nonetheless, that iron can effectively be precipitated from such liquors by this desirable method. More particularly, it has been found in the present invention that when the alkali metal hydroxide is added to liquors of the type mentioned above in quantities exceeding the chemical equivalent of sodium bicarbonate contained in the liquor, iron hydroxide results as a precipitate to the extent that the alkali metal hydroxide exceeds the chemical equivalent of the sodium bicarbonate. Accordingly, the present invention provides for the addition of an alkali metal hydroxide, especially sodium hydroxide, in a quantity equaling, or exceeding if desired, the chemical equivalents of both sodium bicarbonate and the iron impurities of the liquor. In specifying the chemical equivalent of iron, the reference is to trivalent iron, since a lesser quantity of hydroxide might not in some circumstances remove all iron. When the precipitate has formed, it is removed from the liquor by any suitable method, however, preferably by filtration.

Reaction conditions during the precipitation step are not especially critical and the temperature of the liquid may vary from room temperature or somewhat below to as high as 200° F. or more; thus, the process of the invention is applicable to hot or cool liquors substantially equally and it is admirably suited for use in a highly integrated industrial operation.

Iron hydroxide forms as a bulky, flocculent mass which ordinarily does not present a serious problem in filtration and, therefore, special technique is not necessarily essential to the satisfactory application of the invention. However, it has been found that the presence of certain materials in the liquor improves the filterability of the liquor and tends to bring about a more complete removal of the precipitate which has been formed. Accordingly, in the preferred embodiment of the invention a material acting as a coagulant and filter aid is employed. Suitable and exemplary materials are such as zinc oxide, lead oxide, magnesium chloride, calcium chloride and barium carbonate. Of this group, calcium chloride may be mentioned as excellent and perhaps preferable, primarily because of its effectiveness in the environment and also because calcium carbonate is formed by reaction with the carbonate and it is easily removed along with the iron hydroxide and does not create a difficult filtration problem in itself. Furthermore, it is attractive from the standpoint of cost. Zinc oxide may be mentioned as especially effective but is less preferred because of cost. The actual quantity of coagulant is not especially critical, a suitable quantity by volume of the liquor to be treated being from about 0.1 to 1.0%, where a saturated solution of, for example, calcium chloride, is employed. While it is not essential in practicing the invention, it is preferable that the coagulant be added and mixed with the liquor for a short time, for example, about 2 minutes or more, prior to rather than after the addition of the precipitating additive.

The reaction in which the precipitate is formed generally is complete within about 20 minutes, although, in some instances, a shorter time may be satisfactory and in other instances a longer time may be required. Those skilled in the art, of course, will have no difficulty in establishing this factor in the process. It is advantageous that the mixture be agitated mildly as the reaction proceeds.

Specific examples of manners of practicing the invention are presented below for the purpose of further aiding in carrying it into effect.

*Example I*

To 500 ml. of a complex liquor containing approximately 223.7 grams per liter sodium carbonate, 47.9 grams per liter sodium bicarbonate and 0.097 gram per liter iron (Fe) is added 2 ml. of a saturated solution of calcium chloride. With the mixture thus prepared being mildly agitated, after about 2 minutes, 500 ml. of a sodium hydroxide solution containing about 12.9 grams of NaOH are added and allowed to react for a period of about 20 minutes. The mixture is at a temperature between about 185° F. and about 200° F. The precipitate which forms is brown-orange in color and is found to be ferric hydroxide. The mixture is then filtered free of the precipitate and is analyzed for residual iron content. In grams per liter, iron oxide ($Fe_2O_3$) is found in the filtrate liquor to the extent of only 0.0047 gram per liter.

*Example II*

To 3.6 liters of a complex liquor analyzing approximately 243.8 grams per liter sodium carbonate, 42.0 grams per liter sodium bicarbonate, and 0.080 gram per liter iron (Fe) is added about 14.4 ml. of a saturated calcium chloride solution. The mixture is maintained under mild agitation and after about 2 minutes 3.6 liters of a sodium hydroxide solution containing approximately 23 grams per liter sodium hydroxide are added. Agitation is continued and the mixture is allowed to react for approximately 20 minutes. The precipitate which is formed is removed from the liquor by filtration and the liquor is analyzed for remaining iron. Iron ($Fe_2O_3$) is found to be present in the filtrate liquor to the extent of only 0.0033 gram per liter.

Those skilled in the art will appreciate that any hydroxide is suitable provided that it does not introduce an unwanted constituent into the liquor. Thus, it will be readily understood that the invention is not limited to the use of sodium hydroxide and that materials such as the potassium, ammonium, lithium hydroxides, and similarly suitable soluble hydroxides, are especially suitable but that sodium hydroxide is preferred because the sodium ions thereby added present no added problem.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for the removal of iron impurities from a complex liquor containing sodium carbonate and sodium bicarbonate comprising adding a compound selected from the group consisting of alkali metal hydroxides and ammonium hydroxide to the said mixture in an amount at least equimolar to the combined quantity of sodium bicarbonate and iron impurities contained in the said liquor; allowing the mixture thus prepared to react to substantial completion and separating the resulting precipitate from the said mixture.

2. A process as claimed in claim 1 wherein a small quantity of a coagulant-filter aid is added to the said mixture.

3. A process for the removal of iron impurities from a complex liquor containing sodium carbonate and sodium bicarbonate comprising adding sodium hydroxide to the mixture in an amount at least equimolar to the combined quantity of sodium bicarbonate and iron impurities contained in the said liquor, allowing the mixture thus prepared to react to substantial completion and separating the resulting precipitate from the said mixture.

4. The process as claimed in claim 3 wherein a small quantity of a coagulant-filter aid is added to said mixture.

5. The process as claimed in claim 4 wherein the said coagulant-filter aid is added to the said liquor prior to the addition of said sodium hydroxide.

6. The process as claimed in claim 5 wherein the said coagulant-filter aid is calcium chloride and the said process is carried out in the temperature range of about room temperature to about 200° F. accompanied by mild agitation as the reaction proceeds.

References Cited in the file of this patent

UNITED STATES PATENTS

| | | |
|---|---|---|
| 363,952 | Frasch | May 31, 1887 |
| 1,373,887 | Hynes | Apr. 5, 1921 |
| 2,021,987 | Colton | Nov. 26, 1935 |
| 2,124,894 | Pool et al. | July 26, 1938 |
| 2,537,034 | Churchward | Jan. 9, 1951 |
| 2,642,334 | Nugey | June 16, 1953 |

OTHER REFERENCES

Textbook of Chemistry, Edw. Mack, Jr. et al., Ginn and Company, 1st edition, pages 650–651.